March 12, 1963  J. E. SOCKE  3,080,782
FEEDING MECHANISM
Filed Dec. 23, 1958  5 Sheets-Sheet 1
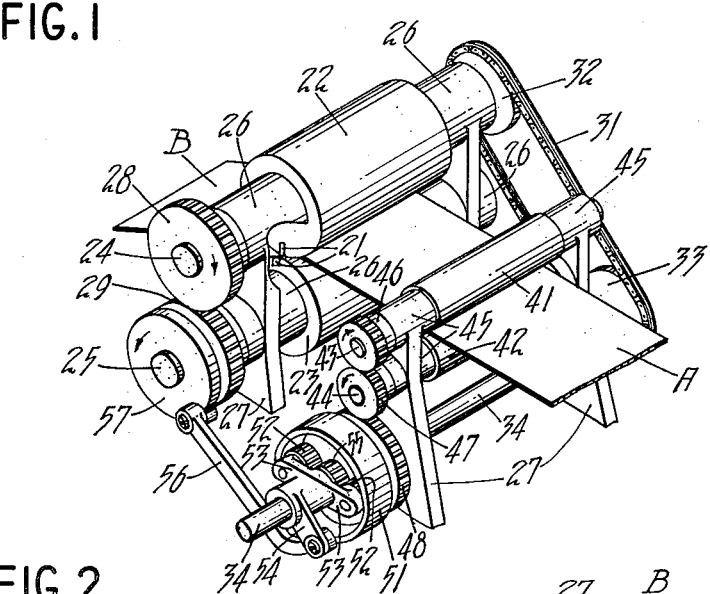
INVENTOR.
JOHN ERIC SOCKE
BY Leland R. McCann
George W. Reiber
ATTORNEYS March 12, 1963
J. E. SOCKE
3,080,782
FEEDING MECHANISM
Filed Dec. 23, 1958
5 Sheets-Sheet 2
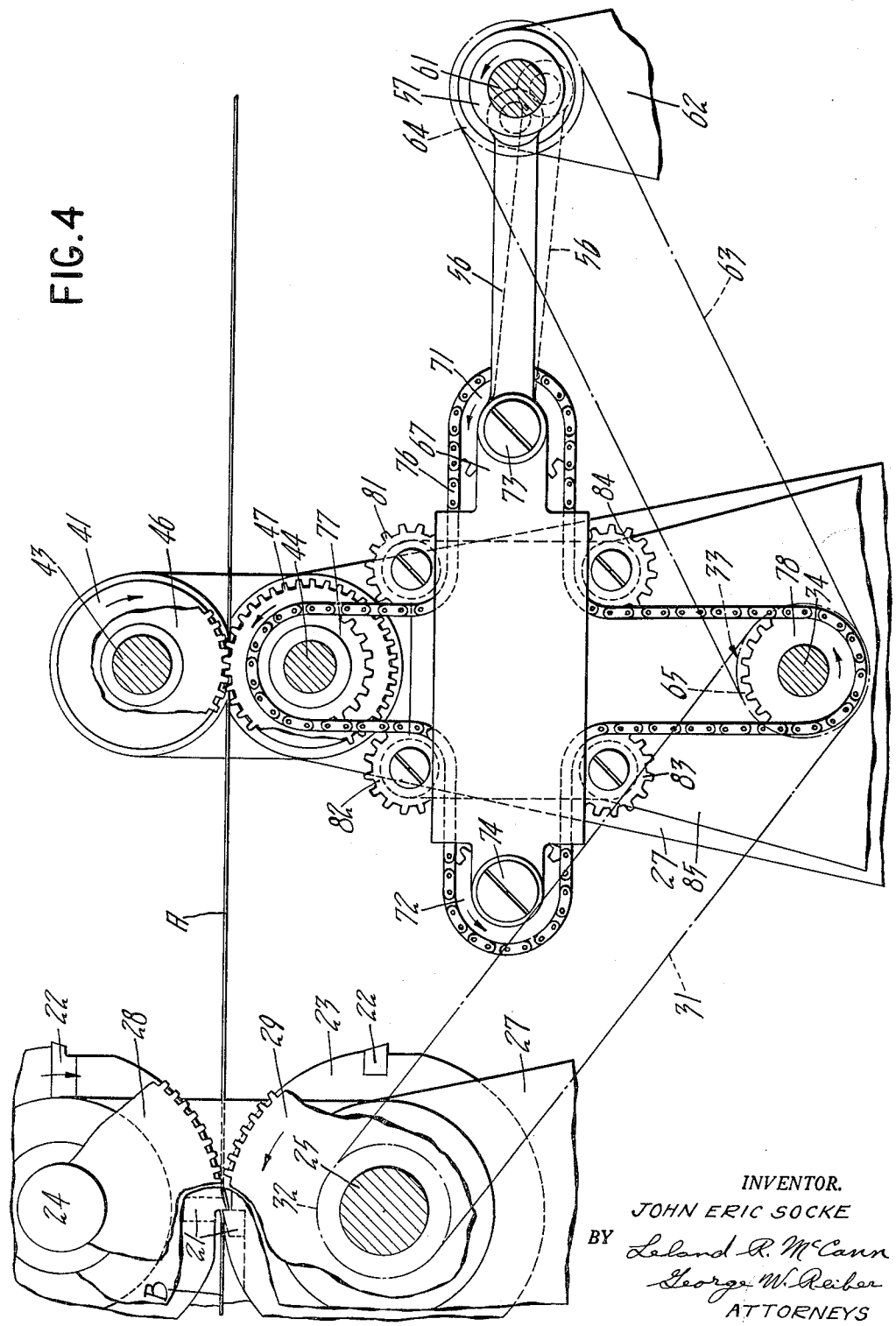
INVENTOR.
JOHN ERIC SOCKE
BY Leland R. McCann
George W. Reiber
ATTORNEYS March 12, 1963 J. E. SOCKE 3,080,782
FEEDING MECHANISM
Filed Dec. 23, 1958 5 Sheets-Sheet 3

INVENTOR.
JOHN ERIC SOCKE
BY Leland R. McCann
George W. Reiber
ATTORNEYS

March 12, 1963 J. E. SOCKE 3,080,782
FEEDING MECHANISM
Filed Dec. 23, 1958 5 Sheets-Sheet 4

INVENTOR.
JOHN ERIC SOCKE
BY Leland R. McCann
George W. Reiber
ATTORNEYS

March 12, 1963  J. E. SOCKE  3,080,782
FEEDING MECHANISM
Filed Dec. 23, 1958  5 Sheets-Sheet 5

INVENTOR.
JOHN ERIC SOCKE
BY Leland R. McCann
George W. Reiber
ATTORNEYS

United States Patent Office 3,080,782
Patented Mar. 12, 1963

3,080,782
FEEDING MECHANISM
John Eric Socke, Pelham Manor, N.Y., assignor to American Can Company, New York, N.Y., a corporation of New Jersey
Filed Dec. 23, 1958, Ser. No. 782,544
3 Claims. (Cl. 83—313)

The present invention relates to a feeding mechanism for advancing strip or web material into and through one or more working stations disposed along a predetermined path of travel and has particular reference to devices for advancing the strip or web at variable speeds throughout a cycle of operation to effect operations on the strip or web at regularly spaced intervals therealong.

In the manufacture of can or container parts from sheet metal delivered in substantially continuous strips or webs, the strip or web often is cut across at equally spaced intervals by flying shears to divide the strip into sheets which are more readily handled or to cut can parts directly from the strip as in transverse rows equally spaced along the strip.

Flying shears utilized for such purposes usually are cumbersome affairs which are limited in speed because of their reciprocating or other travelling movements. Where high speed operations are required, rotary shears are resorted to, but such shears are limited in diameter and hence the spacing of the operations, such as sheet cutting or the like, along the strip is limited to the diametrical capacity of the rotary shears.

An object of the instant invention is to overcome these difficuties by providing a variable speed feeding device which permits of the use of high speed rotary shears for high speed production while simultaneously providing for the feeding of the strip to the shears in a manner which permits of controlling the length of strip between cuts so that the spaces along the strip may be greater or smaller than those determined by the diameter of the shears.

Another object is to provide such feeding devices which varies the speed of travel of the strip through acceleration and deceleration of the strip to provide for spaced operations on the strip irrespective of the angular travel of the rotary working tools.

Another object is to provide for an optimum speed relationship between the travel of the strip and the movement of the cutter or working tool so that operations on the strip may be performed smoothly and accurately at spaced intervals greater or smaller than the stroke or lineal travel of the working tools.

Another object is to provide for such operations on the strip without scuffing or otherwise damaging the strip.

Numerous other objects and advantages of the invention will be apparent as it is better understood from the following description, which, taken in connection with the accompanying drawings, discloses a preferred embodiment thereof.

Referring to the drawings:

FIGURE 1 is a perspective view of a preferred form of apparatus embodying the instant invention, with parts broken away;

FIG. 2 is an enlarged top plan view of the apparatus shown in FIG. 1, with parts broken away;

FIG. 3 is a reduced scale schematic top plan view showing an exemplary spacing of operations performed on a strip, with parts broken away;

FIG. 4 is a side view of a modified form of the invention, with parts broken away;

Figure 5:
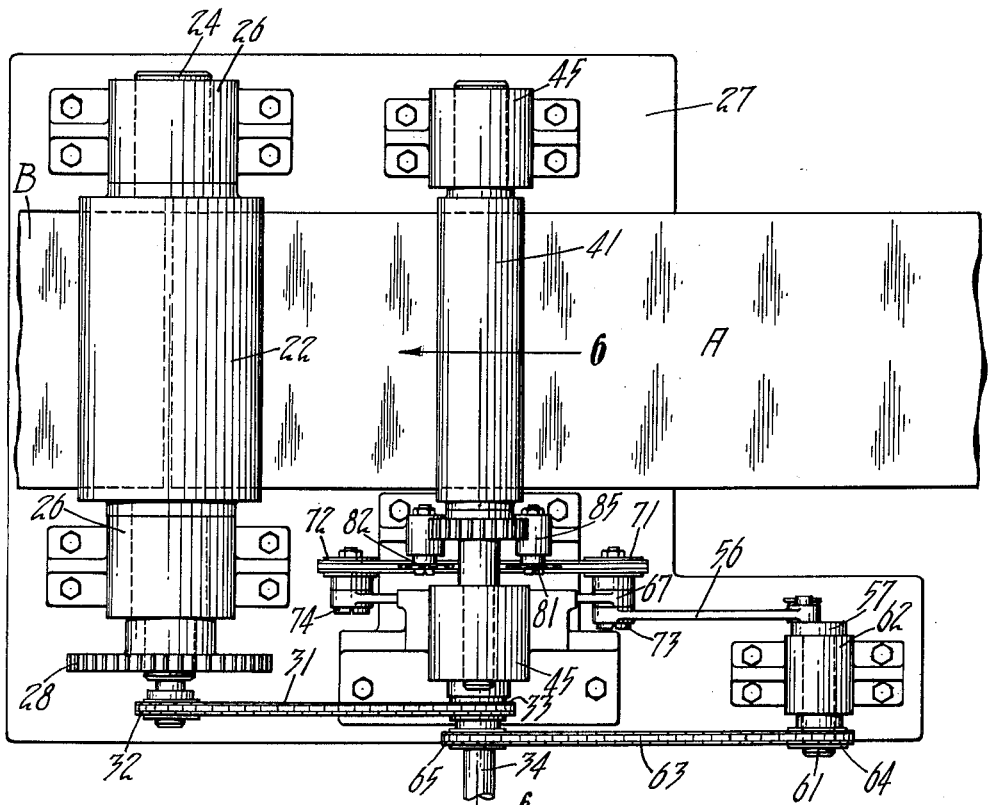
FIG. 5 is a top plan view of the apparatus shown in FIG. 4, with parts broken away.

As a preferred and exemplary embodiment of the instant invention FIGS. 1 and 2 of the drawings illustrate principal parts of a shear and a feeding device for cutting a substantially continuous strip or web A of sheet metal, such as tin plate or black iron into sheets B (FIG. 3) having a highly accurate length C for subsequent use in the manufacture of cans or containers.

The cutting machine or shear may be of any conventional type having upper and lower shear blades 21 which cooperate in any suitable manner to cut the strip transversely as it is advanced between the blades. By way of example of such a shear, the drawings show the shear blades 21 mounted in cooperating upper and lower cutter drums 22, 23 mounted on a pair of spaced and parallel shafts 24, 25 which extend across the path of travel of the strip A through the shear.

The cutter shafts 24, 25 are journaled in bearings 26 attached to a frame 27 which may be a part of the main frame of the shear. The cutter shafts 24, 25 are rotated in the proper directions and in unison, by a pair of meshing gears 28, 29 mounted on the shafts. These cutter shafts 24, 25 are rotated continuously to effect rotation of the shear blades 21 through a timed cycle of operation to cut off one sheet B during each cycle. For this purpose, the upper cutter shaft 24 is rotated by an endless chain 31 which operates over a driven sprocket 32 on the cutter shaft 24 and over a driving sprocket 33 on a driving shaft 34. The driving shaft 34 is journaled in bearings 35 in the frame 27 and is rotated in any suitable manner at a constant speed.

Feeding of the strip A into position between the cutter drums 22, 23 for cutting of the strip into sheets B of precise equal lengths is effected by a variable speed feeding device which includes a pair of parallel, engaging feed rolls 41, 42 between which the strip A passes. These feed rolls 41, 42 extend transversely of the path of travel of the strip A and frictionally engage opposite faces of the strip to advance it without slippage. These feed rolls 41, 42 are the only feed elements for the strip; the cutter drums 22, 23 being merely carriers of the shear blades 21 and having their peripheries in spaced relation so as to clear the strip and thereby provide no means for engaging and advancing the strip.

The feed rolls 41, 42 are mounted on a pair of spaced and parallel, transversely extending shafts 43, 44 which are journaled in bearings 45 in the frame 27 and which are rotated in unison and in the proper direction by a pair of meshing gears 46, 47 mounted on the shafts. These gears 46, 47 are rotated continuously through meshing engagement of the lower gear 47 with a master gear 48 which is freely mounted on and rotated independently of the continuously rotating constant speed driving shaft 34. Through this connection the feed rolls 41, 42 advance the strip A.

The strip A, however, is not advanced at a constant linear speed through this connection. Since it is the object of this invention to cut off sheets B of a greater or lesser length than the length of the circumferential travel of the shear blades 21, so as to keep the diameters of the cutter drums 22, 23 at a minimum, provision is made to feed this greater or lesser length of strip through the machine between cuts and in the time required to effect one cycle of operation, i.e., one rotation of the shear blades 21. This preferably is effected through a simple harmonic rotation of the feed rolls 41, 42 so as to cut the sheets at the slowest speed and feed the strip at the fastest speed. For this purpose the continuously rotated master gear 48 is carried on or is a part of an internal gear 51 which is freely mounted on the constant speed driving shaft 34 adjacent the master gear 48.

The internal gear 51 meshes with a pair of oppositely disposed planetary gears 52 which are mounted on oppositely disposed arms 53 of a crank 54 which is freely mounted on the constant speed driving shaft 34. The planetary gears 52 are also in mesh with a driving gear 55 which is mounted on and rotated with the constant speed driving shaft 34. It is this gear 55 which rotates the planetary gears 52 which in turn rotate the internal gear 51, the master gear 48, the feed roll gears 46, 47 and the feed rolls 41, 42 to advance the strip A.

In order to effect the variable speed of the feed rolls 41, 42 the crank 54 is connected by a link 56 to an eccentric or crank disc 57 mounted on and rotating at constant speed with the lower cutter drum shaft 25. This eccentric disc 57 supplies the simple harmonic rotation hereinbefore mentioned.

Hence as the constant speed main driving shaft 34 rotates the cutter drums 22, 23 at a constant speed to rotate the shear blades 21 at a constant speed through a cycle of operation, it also rotates the eccentric 57 and the gear 55 at constant speed and through the gear 55 rotates the feed rolls 41, 42 at variable speeds.

To effect these variable speeds the rotation of the eccentric 57 causes the link 56 to swing the crank 54 toward the left (as viewed in FIG. 1) as the link connection moves upwardly through an arc over the upper half of the ecentric rotation and this swing of the crank 54 causes the axes of the planetary gears 52 to move in the same direction as the rotation of the internal gear 51 and this decelerates the rotation of the internal gear.

The gear ratios and the location of the link connection of the eccentric, relative to the action of the shear blades 21 is such that the speed of rotation of the feed rolls 41, 42 to feed the strip A is precisely the same as the speed of rotation of the cutter drums 22, 23 at the instant the shear blades 21 come together at the point of cut-off of a sheet B from the moving strip A. Thus during this sheet cut-off operation, the strip A is traveling at a linear speed which is equal to the angular speed of the shear blades 21. Hence cut-off of the sheet is effected smoothly, precisely and without any buckling of the strip A. This cut-off operation is effected at the minimum speed of the internal gear 51.

At the termination of the sheet cut-off operation and after the cut off sheet is clear of the path of travel of the strip A, the eccentric 57 in continuing its rotation, carries the link connection downwardly through an arc along the lower half of the path of rotation of the eccentric. This downward swing of the link connection rocks the crank 54 toward the right (as viewed in FIG. 1) into the position shown in FIG. 1 and this swing of the crank causes the axes of the planetary gears 52 to move in a direction opposite to the direction of rotation of the internal gear 51 and this accelerates the rotation of the internal gear to a maximum speed. Thus during this portion of the cycle of operation, the feed rolls 41, 42 rotate at an increased rate of speed and thereby feed the strip A into the cutter rolls 22, 23 faster, with the result that a greater length of the strip A is advanced through the cutting station.

In this manner a length of strip, unrelated to the distance the cutters must travel, is readily fed through the cutter station while the cutters are spaced apart and is just as readily located at the cutter station for the sheet cut-off operation. Hence sheets of any length may be cut from strip material, by the same cut-off mechanisms, by a mere change in the throw of the eccentric disc 57. By the use of an eccentric or crank the deceleration and acceleration of the feeding of the strip A is effected with a smooth, gradual or simple harmonic motion which tends to permit such change in lineal travel of the strip without slippage and marring of the strip. This provides for accurate measurement of the sheet length and eliminates damage to the strip.

Figure 6:
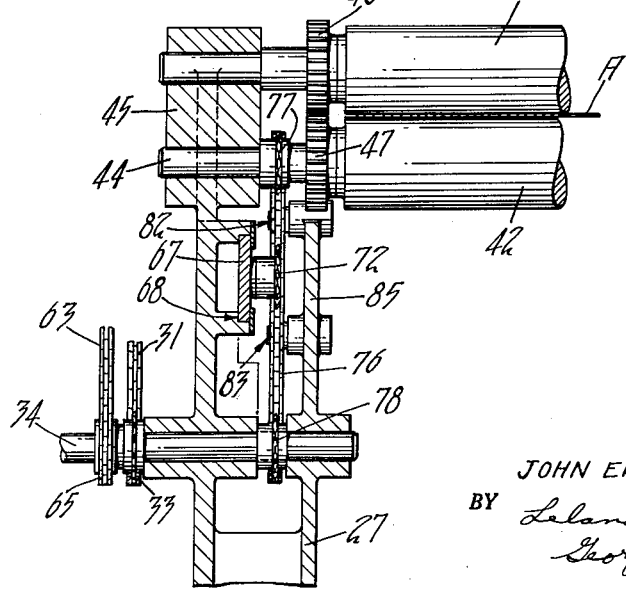
FIG. 6 is a sectional view taken substantially along the line 6—6 in FIG. 5 with parts broken away.

In the modified form of the invention as illustrated in FIGS. 4, 5 and 6 of the drawings, the eccentric or crank disc 57 is mounted on a separate shaft 61 (FIGS 4 and 5) which is journaled in a bearing bracket 62 attached to the frame 27. The eccentric is rotated at constant speed in time with the cutter drums 22, 23 by an endless chain 63 which operates over a sprocket 64 on the eccentric shaft 61 and over a sprocket 65 on the constant speed driving shaft 34.

The link 56 of the eccentric 57 is connected to a horizontally disposed slide 67 which is mounted for reciprocation between the driving shaft 34 and the lower feed roll shaft 44, in a slideway 68 formed in the upright portion of the frame 27 (see FIG. 6). The slide 67 carries a pair of speed change sprockets 71, 72 mounted in spaced relation, one at each end of the slide as best shown in FIG. 4 and rotating on studs 73, 74 secured in the slide. The location of these sprockets 71, 72 relative to the driving shaft 34 and the lower feed roll shaft 44 is such as to provide a Maltese cross formation, which is outlined by an endless chain 76. The chain 76 operates over the two sprockets 71, 72, a sprocket 77 on the lower feed roll shaft 44, and a driving sprocket 78 on the constant speed driving shaft 34. Adjacent the slide 67, the chain 76 operates under four idler sprockets 81, 82, 83, 84 mounted on an upright bracket 85 of the frame 27, in a substantially rectangular or box formation as shown in FIG. 4 which sets off the chain 76 in a plurality of vertical parallel and horizontal parallel runs to resemble the Maltese cross formation hereinabove mentioned.

With this construction of chain drive between the constant speed driving shaft 34 and the lower feed roll shaft 44, the speed of rotation of the latter is readily changed by a horizontal shifting of the slide 67. This is effected by the eccentric 57.

When the eccentric 57 operates to shift the slide 67 toward the right as viewed in FIG. 4, it lengthens the horizontal runs of the chain 76 at the right of the feed rolls 41, 42 and correspondingly shortens the horizontal chain runs at the left. This causes the sprocket 72 to roll back on the upper horizontal chain run at the left and thereby effect a reduction in the speed at which the constant speed drive shaft 34 is rotating the feed rolls 41, 42 through the chain 76. This reduction in speed reaches a minimum when the link connection on the disc 57 reaches its lower mid-point between the left and right dead centers as shown in dotted lines in FIG. 4. At this point the speed of the feed rolls 41, 42 is such as to advance the strip A at a linear speed equal to the angular speed of the shearing blades 21 and it is at this point that a sheet is cut off.

Conversely, when the disc 57 operates to shift the slide 67 toward the left, as viewed in FIG. 4, the horizontal chain runs at the right, shorten, and the corresponding runs at the left, lengthen. This action causes the sprocket 72 to pull faster on the upper chain run at the left and thereby accelerates the speed of the feed rolls 41, 42. This acceleration reaches a maximum when the link connection on the disc 57 is at its midpoint in the upper half of the disc travel between right and left dead centers and it is during this acceleration that the strip A is similarly accelerated to feed a predetermined length of the strip, corresponding to the sheet length C, through the cutting station for the next cut off operation.

Thus as in the preferred form of the invention, the strip A is advanced at a variable or harmonic motion speed from a slowest or minimum speed to a fastest or maximum speed to rapidly feed the strip A through the cutting station between sheet cut-off operations, and thereby provide for the cutting of sheets which are longer than the circumferential travel of the shear blades and still provide for the equalization of travel between the blades and the strip at the instant of cut-off so as to prevent damage to the sheet on the strip.

Figure 7:
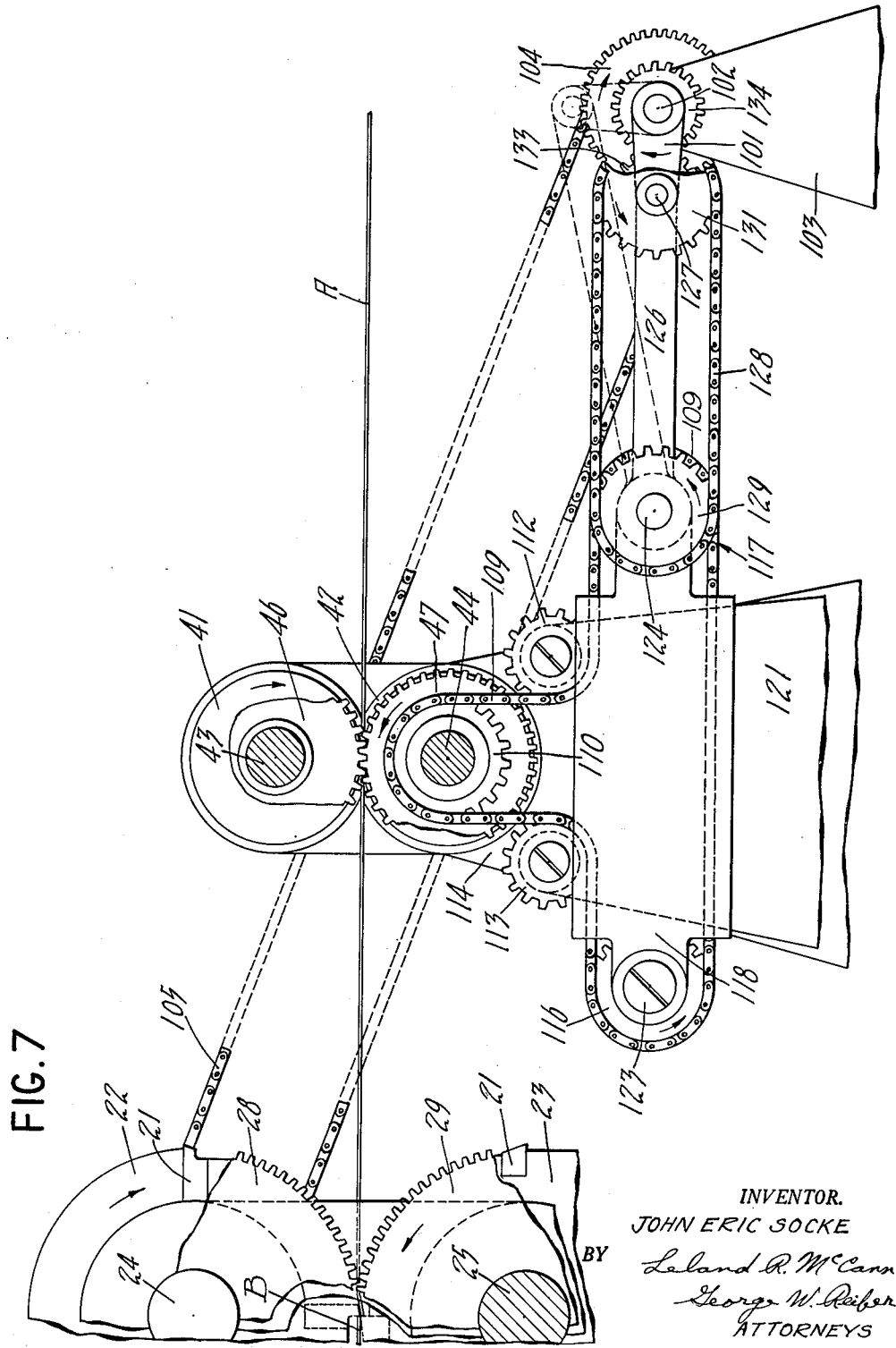
FIG. 7 is a side view of a second modified form of the invention, with parts broken away.
Figure 8:
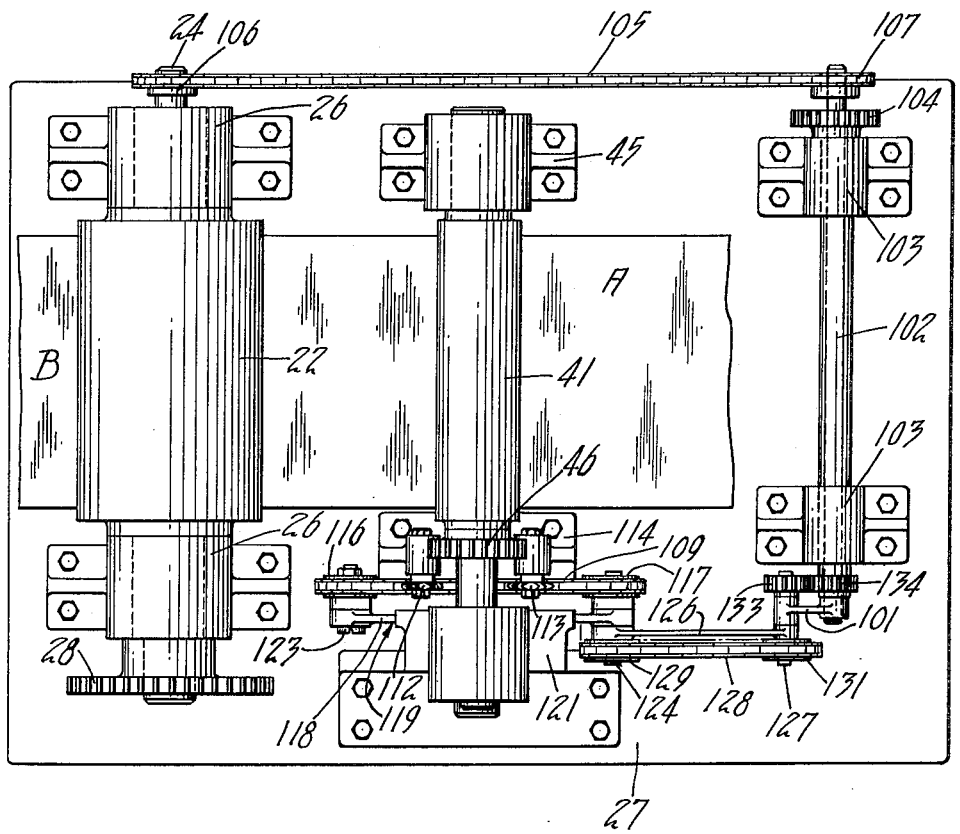
FIG. 8 is a top plan view of the apparatus shown in FIG. 7, with parts broken away.

In the second modified form of the invention as illustrated in FIGS. 7 and 8, the same principle of cutting sheets at the slowest speed and feeding extra strip A through the cutting station at the highest speed, is maintained.

In this second modified form of the invention the eccentric disc 57 preferably is replaced by a crank 101 (FIGS. 7 and 8) which is mounted on a cross shaft 102 journaled in a pair of spaced bearing brackets 103 secured to the frame 27. The shaft 102 is rotated at constant speed in any suitable manner through a gear 104 and in time with the cutter drums 22, 23 through an endless chain 105 which operates over a drive sprocket 106 mounted on the cutter drum shaft 24 and over a sprocket 107 on the crank shaft 101.

Variable rotation of the feed rolls 41, 42 is effected by an endless chain 109 which operates over a sprocket 110 mounted on the lower feed roller shaft 44. The chain 109 extends down in vertical runs from the sprocket 110 and operates under a pair of idler sprockets 112, 113 mounted on studs secured in an upright bracket 114 on the frame 27. From the idler sprockets 112, 113 the chain 109 extends in opposite directions in horizontal runs which operate over a pair of sprockets 116, 117 carried on a horizontal slide 118 mounted for reciprocation in a horizontal slideway 119 formed in an upright bracket 121 disposed adjacent the bracket 114. The sprocket 116 is mounted on a stud 123 in the slide while the sprocket 117 is mounted on a drive shaft 124. One end of the slide 118 is attached by a link 126 to the crank 101 by a pin 127.

The chain 109 is continuously actuated by a driving endless chain 128 which operates over and drives a sprocket 129 secured to the sprocket drive shaft 124 and over a sprocket 131 on the crank pin 127 as shown in FIGS. 7 and 8. The crank pin 127 also carries a pinion 133 which meshes with and rotates around a stationary gear 134 surrounding the crank shaft 102 and secured to the bracket 103.

Hence as the constant speed crank shaft 102 rotates the crank 101 in a clockwise direction as indicated by the arrow in FIG. 7, the pinion 133 revolves around the stationary gear 134 and is rotated at constant speed by this gear to rotate the sprockets 131, 129, 117, 116 and 110 to rotate the feed rolls 41, 42 in the proper direction as indicated by the arrows, to advance the strip A into and through the cutting station.

At the same time the crank motion is actuating the sprockets and the chains connected thereto, it is also shifting the slide 118 through its link connection 126. Like the slide 67 in the modified form of the invention, the slide 118, in being shifted toward the right (FIG. 7), lengthens the horizontal runs of the chain 109 at the right of the feed rolls 41, 42 and correspondingly shortens the horizontal chain runs at the left. This causes the sprocket 116 to roll back on the upper horizontal chain run at the left and thus reduces the linear speed of this portion of the chain, with the result that the speed of the feed rolls 41, 42 is reduced. This deceleration reaches a minimum when the crank pin 127 reaches its upper mid-point between left and right dead centers as shown in dotted lines in FIG. 7. At this point the speed of the feed rolls 41, 42 is such as to advance the strip A at a linear speed equal to the angular speed of the shearing blades 21 and it is at this point that a sheet is cut off.

Conversely when the crank 101 operates to shift the slide 118 toward the left (FIG. 7) the horizontal chain runs at the right, shorten, and the runs at the left correspondingly lengthen. This action causes the sprocket 116 to pull faster on the upper chain run at the left and thereby accelerates the speed of the feed rolls 41, 42. This acceleration reaches a maximum when the crank pin 127 is at its lower mid-point, and it is during this acceleration that the strip A is accelerated to feed a predetermined length of the strip, corresponding to the sheet length C, as in the first modified form of the invention.

Although the operations described hereinbefore relate to devices for feeding the strip at an accelerated speed to provide for the cut-off of sheets greater in length than the circumferential travel of the shear blades 21, it should be readily understood that by adjustment of the throw of the eccentrics or cranks hereinbefore mentioned the speed of travel of the strip between sheet cut-off operations may be adjusted to feed a lesser length of strip A so that sheets lesser in length than the circumferential travel of the shear blades 21 may be provided for if desired.

It is thought that the invention and many of its attendant advantages will be understood from the foregoing description, and it will be apparent that various changes may be made in the form, construction and arrangement of the parts without departing from the spirit and scope of the invention or sacrificing all of its material advantages the form hereinbefore described being merely a preferred embodiment thereof.

I claim:

1. A feeding mechanism for advancing predetermined lengths of a strip material into and through a working station including instrumentalities moving at a constant speed for performing an operation upon said strip at spaced intervals therealong, comprising a pair of feed rolls respectively rotatable about fixed axes for feeding said strip therebetween into and through said station, a reciprocably mounted slide, said slide having a pair of spaced sprockets, an endless chain for driving said feed rolls, said chain connecting said sprockets to said feed rolls with the chain run trained about one said sprocket, said feed rolls, and the other said sprocket, successively, constant speed means for driving said chain continuously in time with said instrumentalities for rotating said feed rolls to advance said strip toward said instrumentalities for the operation upon said strip, control means for reciprocating said slide in time with said instrumentalities to advance and retard the speed of said feed rolls and feed a predetermined length of the strip at a speed unrelated to that of said instrumentalities to relocate a predetermined length of said strip at said station after each operation thereupon, whereby said strip is advanced solely through said chain connection to said feed rolls with the speed of the latter determined by said slide and said control means.

2. A feeding mechanism of the character defined in claim 1 wherein said sprockets are disposed between said feed rolls and said constant speed means and wherein there are provided a plurality of idler gears in box formation to retain said chain in a maltese cross configuration.

3. A feeding mechanism of the character defined in claim 1 wherein said control means comprises a constant speed rotating crank connected to said slide for effecting reciprocation of said slide to change the speed of said feed rolls, and having means for rotating said crank in time with said instrumentalities, and wherein said constant speed means comprises a stationary gear disposed at the axis of said crank, a driving gear on said crank and meshing with said stationary gear for driven revoluble rotation therearound, and a driving connection between said driving gear and onet of said slide sprockets for continuously driving said chain.

References Cited in the file of this patent
UNITED STATES PATENTS

| | | |
|---|---|---|
| 1,876,456 | Iversen et al. | Sept. 6, 1932 |
| 1,967,558 | Mikaelson | July 24, 1934 |
| 2,301,543 | Hlavaty | Nov. 10, 1942 |
| 2,410,555 | Stevens | Nov. 5, 1946 |
| 2,415,428 | Iversen | Feb. 11, 1947 |
| 2,655,098 | Dutro | Oct. 13, 1953 |
| 2,747,866 | Schmidt | May 29, 1956 |
| 2,753,183 | Wiig et al. | July 3, 1956 |